United States Patent
Teyssie et al.

[11] Patent Number: 5,756,585
[45] Date of Patent: May 26, 1998

[54] STAR-SHAPED COPOLYMERS AND PROCESS FOR THEIR MANUFACTURE

[75] Inventors: Philippe Teyssie, Neuville-en-Condroz; Roger Fayt, Neupre; Sunil K. Varshney, Liege; Christian Jacobs, Hognoul, all of Belgium

[73] Assignee: Atochem, Paris, France

[21] Appl. No.: 383,437

[22] Filed: Feb. 3, 1995

Related U.S. Application Data

[62] Division of Ser. No. 109,474, Aug. 20, 1993, abandoned, which is a continuation of Ser. No. 781,207, Dec. 12, 1991, abandoned.

[30] Foreign Application Priority Data

Jul. 10, 1989 [FR] France ................ 89/09267

[51] Int. Cl.$^6$ ................ C08F 297/02
[52] U.S. Cl. ................ 525/299; 525/94; 525/302; 525/333.3; 525/361; 525/364; 525/366; 526/173
[58] Field of Search ................ 525/200, 94, 302, 525/333.3, 361, 364, 366; 526/173

[56] References Cited

U.S. PATENT DOCUMENTS

| | | | |
|---|---|---|---|
| 4,659,782 | 4/1987 | Spinelli | 525/293 |
| 5,395,884 | 3/1995 | Gnanou | 525/94 |

*Primary Examiner*—Fred Zitomer
*Attorney, Agent, or Firm*—Finnegan, Henderson Farabow, Garrett & Dunner, L.L.P.

[57] ABSTRACT

A process for manufacturing a star shaped block polymer of formula $(PA-PB-PC)_n-N-(PD-PE)_m$ wherein PA, PB and PC are respectively vinylaromatic/methacrylic blocks, acrylic blocks and methacrylic blocks. PD is a polymer block selected from vinylaromatic and/or methacrylic monomer units. PE is an acrylic polymer block. n is 2 to 20 and m is 0 to 18 with the proviso that m+n is $\leq 20$. The process proceeds by anionic polymerization in the presence of a monofunctional initiator of formula (II), $$(R)_p-M$$

wherein M is an alkali or alkaline earth metal. p is 1 or 2 and R is a straight or branched alkyl radical having 2 to 6 carbon atoms or a $C_1$ to $C_6$ substituted alkyl radical.

19 Claims, No Drawings

STAR-SHAPED COPOLYMERS AND PROCESS FOR THEIR MANUFACTURE

This application is a division of application Ser. No. 08/109,474, filed Aug. 20, 1993, now abandoned, which was a continuation of application Ser. No. 07/781,207, filed as PCT/FR90/00488 Jun. 29, 1990, abandoned.

The present invention relates to star-shaped copolymers based especially on vinylaromatic and/or methacrylic blocks and on acrylic blocks, and to a process for the manufacture of these copolymers.

At the present time, heterophase materials form one of the main foci of interest of polymer science, and block copolymers form one of the most interesting classes of these. The separation into microphases which takes place in those of these copolymers which contain immiscible blocks results, in fact, in the appearance of advantageous, novel, sometimes unexpected properties, which depend on the particular morphology adopted by the phases. These possibilities have been illustrated remarkably by the discovery and the industrial development of thermoplastic elastomers.

In addition, interest has been shown for a number of years in macromolecules which exhibit a particular topochemistry, such as star-shaped polymers. Methods of anionic polymerisation in homogeneous phase, which produce polymeric chains having organometallic ends (living polymers) have been employed especially for the synthesis of star-shaped macromolecules. It is by reacting monocarbanionic "living" polystyrenes with nonfunctional electrophilic compounds such as $SiCl_4$, trichloromethylbenzenes or else the trimer of phosphonitrile chloride that Morton et al., J. Polymer Sci., 57, 471 (1962) and other authors have succeeded in preparing star-shaped polymers. Subsequently, J.-G. Zilliox et al., J. Polymer Sci.: Part C, No. 22, pages 145–156 (1968) have employed anionic block copolymerisation using, as second monomer, a divinyl compound such as divinylbenzene, glycol dimethacrylate and hexanediol dimethacrylate. The macromolecules obtained consist of a crosslinked nodule surrounded and protected by a number of solvated linear chains.

European Patent Application No. 0,274,318 describes a system capable of controlling the "living" anionic polymerisation of acrylic or methacrylic monomers, if appropriate with vinyl monomers and especially hindered acrylates such as tert-butyl acrylate. This system is based on the formation of a complex between the ion pair of a conventional initiator such as sec-butyllithium and a ligand or complexant which has well-adapted steric and electronic characteristics. Cyclic polyethers (or crown ethers) and cyclic polythioethers are numbered among these ligands and make it possible to polymerise, among others, tert-butyl acrylate quickly and quantitatively in a perfectly "living" manner. Also, U.S. Pat. No. 4,767,824 describes, as another ligand, a salt of an alkali or alkaline-earth metal and of an inorganic acid, such as lithium chloride.

The Applicant Company has now found that these initiator+ligand systems can be employed to permit the synthesis of star-shaved copolymers. Such star-shaped copolymers, whose composition made up of flexible, semi-flexible or hard blocks is chosen as a function of the intended applications of the resulting copolymers, exhibit the advantage, over the corresponding linear block copolymers, of better rheological behaviour, because they are less viscous.

International application WO 86/00626 describes the manufacture of star-shaped polymers comprising acrylic blocks by polymerisation techniques using group transfer by the "arm-first", "core-first" or "arm-core-arm" approaches (in its Example 8, this international application describes the preparation of a star-shaped copolymer (PBu—PMMA) $_n$—N by the "core-first" technique:

The synthesis of copolymers containing acrylic and methacrylic blocks in which the other monomer does not contain any conjugated carbonyl group (styrene, substituted styrene etc) is not possible by this technique. It is possible according to the invention.

The synthesis of star-shaped copolymers in which the arms comprise two or three blocks and where a monomer of acrylate type is polymerised in the first stage followed by the polymerisation of the monomer of methacrylate type, in other words the polymerisation of a methacrylate initiated by polyacrylate anions is not possible either by this technique. According to the invention, the monomeric methacrylate can be initiated by the tert-butyl polyacrylate anion and vice versa.

The present invention relates firstly to these star-shaped copolymers denoted by the general formula (I):

in which:
either

PA denotes a polymer block originating from at least one monomer A chosen from vinylaromatic and methacrylic monomers;

PB denotes a polymer block originating from at least one acrylic monomer B; and

PC is optionally present, in which case it denotes a polymer block originating from at least one monomer C chosen from methacrylic monomers;

or:

each of PA and PC denotes a polymer block originating from the same single acrylic monomer;

and PB denotes a polymer block originating from at least one monomer B chosen from methacrylic monomers;

PD denotes a polymer block originating from at least one monomer D chosen from vinylaromatic and methacrylic monomers, and simultaneously PE denotes a polymer block originating from at least one acrylic monomer E; or else PD denotes a polymer block originating from at least one acrylic monomer D and simultaneously PE denotes a polymer block originating from at least one methacrylic monomer E;

n denotes the number of branches of (PA—PB—PC) and is between 2 and 20 inclusive, and m denotes the number of branches of (PD—PE) and is between 0 and 18 inclusive, on condition that the sum n+m does not exceed the value of 20, it being furthermore possible for each of the branches (PA—PB—PC) and (PD—PE) to comprise only a single polymer block, in which case the two blocks are different, one being of an acrylic monomer and the other of a monomer chosen from vinylaromatic and methacrylic monomers; and N denotes a crosslinked nodule of at least one polymerised monomer Mr, the said monomer Mr consisting of a multifunctional crosslinking agent containing at least two polymerisable double bonds per molecule.

By way of examples of vinylaromatic monomers on which the star-shaped copolymers of the invention are based there may be mentioned styrene, substituted styrenes such as, for example, alpha-methylstyrene, 4-methylstyrene, 3-methylstyrene, 4-methoxystyrene, 2-hydroxymethylstyrene, 4-ethylstyrene, 4-ethoxystyrene, 3,4-dimethylstyrene, 2-chlorostyrene, 3-chlorostyrene, 4-chloro-3-methylstyrene, 3-tertbutylstyrene, 2,4- dichlorostyrene and 2,6-dichlorostyrene, 1-vinylnaphthalene, and mixtures of these monomers. Styrene and alpha-methylstyrene are mentioned more particularly.

By way of examples of methacrylic monomers on which the star-shaped copolymers of the invention are based there may be mentioned alkyl methacrylates in which the alkyl radical, substituted if appropriate, for example by at least one halogen atom such as chlorine or fluorine and/or at least one hydroxyl group), contains 1 to 18 carbon atoms, such as methyl methacrylate, which is preferred, and ethyl, 2,2,2-trifluoroethyl, n-propyl, isopropyl, n-butyl, sec-butyl, tert-butyl, n-amyl, isoamyl, hexyl, 2-ethylhexyl, cyclohexyl, octyl, isooctyl, decyl, h-hydroxyethyl, hydroxypropyl and hydroxybutyl methacrylates, glycidyl methacrylate, norbornyl methacrylate, isobornyl methacrylate, methacrylonitrile, dialylmethacrylamides, and mixtures of these monomers.

By way of examples of acrylic monomers on which the star-shaped copolymers of the invention are based there may be mentioned primary, secondary or tertiary alkyl acrylates in which the alkyl group, substituted if appropriate, for example by at least one halogen atom such as chlorine or fluorine and/or at least one hydroxyl group, after protection of this hydroxyl group, contains from 1 to 18 carbon atoms, more particular mention being made of ethyl acrylate, propyl acrylate, isopropyl acrylate, butyl acrylate, isobutyl acrylate, hexyl acrylate, tert-butyl acrylate, 2-ethylhexyl acrylate, nonyl acrylate, lauryl acrylate, stearyl acrylate, cyclohexyl acrylate and isodecyl acrylate. It is also possible to use phenyl acrylate, norbornyl acrylate, isobornyl acrylate and alkylthioalkyl or alkoxyalkyl acrylates, especially methoxy- and ethoxyethyl acrylate and also acrylonitrile and dialkylacrylamides.

As for the crosslinking monomer Mr, this may be chosen especially from polyol polymethacrylates and polyacrylates, such as alkylene glycol dimethacrylates, such as ethylene glycol dimethacrylate, 1,3-butylene glycol dimethacrylate, 1,4-butylene glycol dimethacrylate and propylene glycol dimethacrylate, alkylene glycol diacrylates such as ethylene glycol diacrylate, 1,3- or 1,4-butylene glycol diacrylate, trimethylolpropane trimethacrylate and vinylacrylate and methacrylate.

The (PA—PB—PC) branches and, if appropriate, the (PD—PE) branches of the star-shaped copolymer according to the invention generally represent approximately 80 to 98 parts by weight and its nodule N approximately 20 to 2 parts by weight, per 100 parts by weight of the said copolymer.

The star-shaped block copolymers of the present invention can exhibit a number-average molecular mass of approximately 1000–500,000 in the case of each of their blocks.

Furthermore, their polydispersity index is generally between approximately 1.1 and 2.

According to an alternative form of the present invention, the blocks denoting a block of an acrylic and/or methacrylic monomer, as defined above, can be hydrolysed to a block of the corresponding acrylic and/or methacrylic acid and, if appropriate, the said block can be subsequently saponified to a block of the corresponding alkali metal acrylate and/or methacrylate. According to another alternative form of the present invention the blocks denoting a block of an acrylic and/or methacrylic monomer, as defined above, can be transesterified to a block of another acrylic and/or methacrylic monomer, for example so as to replace a tertiary or secondary acrylate with a primary acrylate.

The present invention also relates to a process for the manufacture of a star-shaped copolymer of formula:

in which:
either:

PA is optionally present and denotes a polymer block originating from at least one monomer A chosen from vinylaromatic and methacrylic monomers;

PB denotes a polymer block originating from at least one acrylic monomer B; and

PC is optionally present, in which case it denotes a polymer block originating from at least one monomer C chosen from methacrylic monomers;

or:

each of PA and PC denotes a polymer block originating from the same single acrylic monomer;

and

PB denotes a polymer block originating from at least one monomer B chosen from methacrylic monomers;

PD denotes a polymer block originating from at least one monomer D chosen from vinylaromatic and methacrylic monomers, and simultaneously PE denotes a polymer block originating from at least one acrylic monomer E; or else PD denotes a polymer block originating from at least one acrylic monomer D and simultaneously PE denotes a polymer block originating from at least one methacrylic monomer E;

n denotes the number of branches of (PA—PB—PC) and is between 2 and 20 inclusive, and m denotes the number of branches of (PD—PsE) and is between 0 and 18 inclusive, on condition that the sum n+m does not exceed the value of 20, it being furthermore possible for each of the branches (PA—PB—PC) and (PD—PE) to comprise only a single polymer block, in which case the two blocks are different, one being of an acrylic monomer and the other of a monomer chosen from vinylaromatic and methacrylic monomers; and N denotes a crosslinked nodule of at least one polymerised monomer Mr, the said monomer Mr consisting of a multifunctional crosslinking agent containing at least two polymerisable double bonds per molecule,
characterised in that:

(1) an anionic polymerisation of at least one monomer A is conducted with the aid of an initiating system consisting of at least one monofunctional initiator of formula:

in which:

M denotes an alkali or alkaline-earth metal (valency p of 1 or 2); and

R denotes a straight- or branched-chain alkyl radical containing 2 to 6 carbon atoms or an optionally substituted aryl radical or an alkyl radical containing 1 to 6 carbon atoms substituted by at least one phenyl group, and, if appropriate, at least one ligand chosen from the salts of alkali or alkaline-earth metals, organic salts of alkali metals and non-nitrogenous macrocyclic complexants, which makes it possible to obtain a living chain unit of the polymer block PA; then (2) the said living chain unit thus obtained is reacted with at least one monomer B in the presence of at least one ligand such as defined above, which makes it possible to obtain a living diblock copolymer (PA—PB)⁻, then (3) the said living diblock copolymer thus obtained is reacted with at least one monomer C in the presence of at least one ligand as defined above, which makes it possible to obtain the living triblock copolymer (PA—PB—PC)⁻; it being possible for stage (3) to be omitted and it being possible for the process to be started by conducting stage (1) with the monomer B, or else only one living block PA⁻ or PB⁻ or PC⁻ may be formed;

(4) if appropriate, a living diblock copolymer (PD—PE)⁻ is formed by proceeding as in (1) and (2), but starting with at least one monomer D and at least one monomer E; or else a living block PD⁻ or PE⁻ is formed by conducting stage (1) with the monomers D or E, (5) the living copolymer (PA—PB—PC)⁻ or (PA—PB)⁻ or (PB—PC)⁻ or the living block PA⁻ or PB⁻ or PC⁻, if appropriate mixed with the living diblock copolymer (PD—PE)⁻ or the living block PD⁻ or PE⁻ obtained according to (4) is reacted in the medium which has been used for conducting their polymerisation by anionic route, with at least one monomer Mr in a molar excess of 4 to 26 per active centre, and the double bonds are deactivated by a reaction with a source of protons, consisting especially of an alcohol, water or a protonic acid; and (6) if appropriate, a transesterification of the star-shaped copolymer obtained is conducted in an acidic medium.

The monofunctional initiating agents of formula (II) employed in stage (1) are, for example, sec-butyllithium, n-butyllithium and alpha-methylstyryllithium, 1,1-diphenylhexyllithium, diphenylmethyllithium or sodium or potassium and 1,1-diphenyl-3-methylphenyllithium. When the PA block originates from a vinylaromatic monomer, sec-butyllithium, n-butyllithium and alpha-methylstyryllithium are chosen as initiators.

The ligand may be chosen from, on the one hand, inorganic salts of alkali or alkaline-earth metals, for example chlorides, fluorides, bromides, iodides, borides, sulphates, nitrates and borates and, on the other hand, organic salts of alkali metals, for example alcoholates, esters of a carboxylic acid substituted by the said metal in a position, and compounds in which the said alkali metal is associated with a group such as:

(A) the groups of formula:

in which $R_1$ is a linear or branched alkyl radical containing from 1 to 20 carbon atoms or else a cycloalkyl radical containing from 3 to 20 carbon atoms or, again, an aryl radical containing from 6 to 14 carbon atoms, (B) the groups of formula:

in which:

Y and Z, which are identical or differ from each other, are chosen from the hydrogen atom and
halogen atoms;
p is an integer ranging from 0 to 4,
X is a halogen atom, and
q is an integer ranging from 0 to 2,
(C) the groups of formula:

in which T is chosen from the hydrogen atom and halogen atoms, and (D) the groups of formula:

in which $R_2$ is chosen from the hydrogen atom and alkyl and aryl radicals.

Examples of groups of formula (III) are acetate, propionate and benzoate groups. Examples of groups of formula (IV) are α-bromoacetate and trifluoroacetate groups. Examples of groups of formula (V) are trifluoromethanesulphonic and methanesulphonic groups. Examples of groups (VI) are borohydride and tetraphenylboride groups.

The ligand may also consist of a non-nitrogenous macrocyclic complexing agent chosen especially from cyclic polyethers (also called crown ethers) and cyclic polythioethers, such as especially macrocyclic polyethers whose macrocyclic ring contains at least 14 carbon and oxygen atoms, each oxygen atom of the ring being separated from the other oxygen atoms of the ring by two or else three carbon atoms: such macrocyclic polyethers have already been described in U.S. Pat. Nos. 3,687,978 and 4,826,941, the content of which is incorporated by reference in the present description.

The proportion of ligand employed in the process according to the invention can vary greatly in relation to the initiator in stage (1). For example, this quantity may be greatly excessive in relation to the molar quantity of initiating agent. This quantity may also be equal to or smaller than the molar quantity of initiating agent. The ligand is preferably introduced in a molar proportion to the initiator which is at least equal to 1 and which ranges up to approximately 50.

In the process according to the invention the polymerisations in stages (1) to (5) are carried out in the absence of moisture and oxygen and in the presence of at least one solvent chosen preferably from aromatic solvents such as benzene and toluene, or else tetrahydrofuran, diglyme, tetraglyme, ortho-terphenyl, biphenyl, decalin, tetralin or dimethylformamide.

As for the temperature of polymerisation or copolymerisation, this may vary between approximately –78° C. and 0° C., preferably between approximately –78° C. and –200° C.

The copolymers according to the invention can be hydrolysed at a temperature ranging approximately from 700° to 1700° C., at a pressure ranging from 1 to 15 bars and in the presence of approximately from 0.5 to 10% by weight, relative to the copolymer, of an acidic catalyst such as para-toluenesulphonic acid, methane toluenesulphonic acid or hydrochloric acid, in a polar solvent such as dioxane. After hydrolysis, the copolymers containing acrylic and/or methacrylic acid blocks can be precipitated in heptane, filtered, washed to remove all traces of catalyst, and finally dried. They can also be subsequently neutralised with methanolic potassium hydroxide or else with tetramethylammonium hydroxide in solution in a mixture of toluene and methanol, in order to form the corresponding triblock ionomers.

When the copolymers according to the invention contain a block derived from tertiary or secondary alkyl acrylate, this block can also be transesterified in a known manner to a primary alkyl acrylate block.

The blocks of polymers originating from vinylaromatic monomers and from poly(methyl methacrylate) of the star-shaved copolymers according to the invention are rigid blocks; the poly(alkyl other than methyl methacrylate) blocks may be semiflexible or rigid blocks; and the poly (alkyl acrylate) blocks are flexible blocks, imparting stability on aging. Depending on the content of rigid, flexible and semiflexible blocks, what is obtained in the case of the star-shaped polymers of the invention is thermoplastic elastomers (which have an acrylic flexible block composition of the order of 60–90 % by weight) which are applicable especially to the manufacture of injection-moulded articles; impact rigid thermoplastic polymers (which have a flexible block composition of the order of 10–50 % by weight); and impact reinforcing polymers for various thermoplastic matrices (in the case of a flexible block composition of the order of 40–80 % by weight).

The following examples illustrate the present invention without limiting its scope.

In these examples,

ST=styrene

α-Mest=alpha-methylstyrene tBA=tert-butyl acrylate nBA=n-butyl acrylate

MMA=methyl methacrylate

EDMA=ethylene glycol dimethacrylate $(H_2C=C(CH_3)COOCH_2)_2$

PTSA=para-toluenesulphonic acid monohydrate

THF=tetrahydrofuran.

In all these examples, the exclusion chromatography has been performed using a Waters G-C 501 apparatus equipped with two linear columns, with tetrahydrofuran as eluent at a flow rate G-F 1 ml/min. The number-average molecular masses were determined by means of an HP 502 membrane osmometer.

EXAMPLES 1 TO 7

GENERAL OPERATING METHOD

The synthesis route can be depicted schematically as follows:

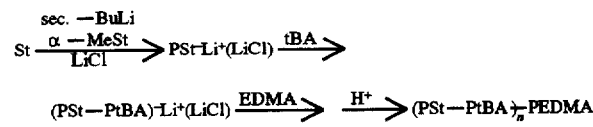

The solvents and the styrene monomer are purified by methods which are usually employed in anionic polymerisation; the acrylic monomers are treated successively with calcium hydride and triethylaluminium.

The styrene polymerisation is initiated in THF at −780° C. with an organolithium compound which has been obtained by reacting sec-butyllithium with α it in a molar excess of α-MeSt (10×) in the presence of 5 moles of LiCl per mole of this organolithium compound.

After 15 minutes at −78° C. tert-butyl acrylate is added to the reaction mixture using metal capillaries, under an inert atmosphere. The anionic block copolymerisation of tert-butyl acrylate is carried out over a period of 2 hours in THF at −78° C.

The living diblock copolymer (PSt—PtBa) Li⁺ thus obtained is then coupled at −78° C. by adding EDMA to it in a molar excess of 4 to 26 relative to the organolithium active centres and allowing it to react for at least 2 hours. The copolymer solution is then poured with stirring into a large excess of methanol, and the precipitate is washed, filtered off and dried at 100° C. Star-shaped block copolymers are thus obtained in which the number of branches n can vary between 2 and 6.

In order to endow the material with its thermoplastic elastomer properties, the PtBA block is then transesterified to PnBA. The transesterification reaction takes place with acidic catalysis with the aid of PTSA.

A precise quantity of the star-shaped copolymer is dissolved in a toluene/n-butanol mixture in a round bottom flask fitted with a condenser and kept under inert atmosphere. The quantity of n-butanol corresponds at least to a molar excess of 3 relative to the tBA units.

After dissolution, the quantity of PTSA needed for a quantitative transesterification of the acrylic block is added (corresponding to 3–5 mol % relative to PtBA). The solution is then refluxed (−120° C.) for 5 hours.

After reaction, the solution of the star-shaped block copolymer (PSt—PnBA)ₙ—PEDMA is then poured with stirring into a large excess of 50/50 methanol/H₂O. The precipitate is washed and filtered off. The precipitation stage is repeated twice to remove all traces of catalyst.

The final product is then dried at 100° C. under reduced pressure. The yield of the transesterification reaction is checked by proton M and by differential thermal analysis.

Disappearance of the peak corresponding to the tert-butyl group, situated at 1.39 ppm, and appearance of the peak corresponding to $CH_2$ of the n-BA ester group, situated at 4 ppm.

Appearance of a glass transition at −45° C. corresponding to the PnBA block and disappearance of the glass transition of the PtBA block situated at −+45° C.

Under the abovementioned conditions the transesterification yield is close to 95%. The remaining 5% consist of acrylic acid units, capable of being neutralised subsequently.

The characteristics of the various products obtained are shown in Table 1 below.

TABLE 1

| Ex. | $\overline{M_n}$ of PSt-PtBa* | $\overline{M_n}$ of PtBA* | % of tBA by weight** | Mw/Mn PSt-PtBA | Mole EDMA Mole sec.BuLi | n̄* | % coupling |
|---|---|---|---|---|---|---|---|
| 1 | 90,000 | 63,000 | 70.5 | 1.05 | 9.0 | 4.5 | 86 |
| 2 | 70,000 | 57,000 | 76.0 | 1.10 | 9.6 | 5.5 | 87 |
| 3 | 66,000 | 47,000 | 67.0 | 1.10 | 4.0 | 4.5 | 76 |
| 4 | 65,000 | 40,000 | 68.5 | 1.20 | 26.0 | 6.0 | 80 |
| 5 | 49,000 | 39,500 | 76 | 1.08 | 8.7 | 4.2 | 82 |

TABLE 1-continued

| Ex. | $\overline{Mn}$ of PSt-PtBa* | $\overline{Mn}$ of PtBA* | % of tBA by weight** | $\overline{Mw}/\overline{Mn}$ PSt-PtBA | Mole EDMA Mole sec.BuLi | $\bar{n}$* | % coupling |
|---|---|---|---|---|---|---|---|
| 6 | 120,000 | 90,000 | 80 | 1.06 | 9.0 | 3.7 | 80 |
| 7 | 64,000 | 51,000 | 82 | 1.05 | 7.2 | 3.7 | 92 |

*Values determined by gel exclusion chromatography
**Value determined by $^1$H NMR Table 2 shows the mechanical properties of the copolymers of Examples 1, 2, 3 and 5, after transesterification.

TABLE 2

| | Polymer | Breaking stress* | | Elongation at break* |
|---|---|---|---|---|
| Ex. | (PSt-PnBA)$_n$PEDMA** | $\bar{\sigma}_r$ N/mm$^2$ | (kg/mm$^2$) | $\bar{\epsilon}_r$ (%) |
| 1 | 27–63 | 10.8 | (1.1) | 416 |
| 2 | 13–57 | 10.8 | (1.1) | 373 |
| 3 | 19–47 | 9.8 | (1.0) | 417 |
| 5 | 9.5–39.5 | 12.7 | (1.3) | 530 |

*Values determined from stress-elongation curves at a pulling speed of 2 cm/min.
**$\overline{Mn} \times 10^{-3}$.

are carried out under the same conditions as those described for Examples 1 to 7. The PtBA block is then transesterified to PnBA; the transesterification reaction takes place using acidic catalysis with he aid of PTSA according to the operating method described for Examples 1 to 7.

Under these conditions the PMMA block remains intact and the transesterification yield is close to 95% as in the preceding examples.

Table 3 below shows the characteristics of a product obtained under these conditions.

TABLE 3

| Ex. | $\overline{Mn}$ of PMMA-PtBA* | $\overline{Mn}$ of PtBA* | % of tBa by weight** | $\overline{Mw}/\overline{Mn}$ PMMA-PtBA | Mole EDMA Mole sec.BuLi | $\bar{n}$* | % of coupling |
|---|---|---|---|---|---|---|---|
| 8 | 56,000 | 41,000 | 65 | 1.08 | 5.5 | 4.1 | 57 |

*Values determined by gel exclusion chromatography
**Value determined by $^1$H NMR

EXAMPLE 8

GENERAL OPERATING METHOD

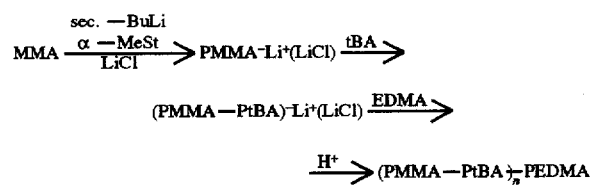

The solvents are purified by techniques which are usually employed in anionic polymerisation; the acrylic monomers are treated successively with calcium hydride and triethylaluminium. The first PMMA block is initiated in THF at −78° C. with an organolithium compound which has been obtained by reacting sec-butyllithium with a slight molar excess of a-MeSt in the presence of 5 moles of LiCl per mole of this organolithium compound. After one hour's polymerisation at −78° C. t-BA is introduced into the reaction mixture by employing a transfer technique via metal capillaries, under an inert atmosphere, and the block anionic copolymerisation of this second monomer is carried out for a period of one hour in THF at −78° C.

The coupling, using EDMA, of the living (PMMA—PtBA)⁻Li⁺ diblock copolymer thus obtained and its recovery Table 4 shows the mechanical properties of the material of Example 8, after transesterification.

TABLE 4

| | Polymer | Breaking stress* | | Elongation at break* |
|---|---|---|---|---|
| Ex. | (PSt-PnBA)$_n$PEDMA** | $\bar{\sigma}_r$ N/mm$^2$ | (kg/mm$^2$) | $\bar{\epsilon}_r$ (%) |
| 8 | 15–41 | 12.7 | (1.3) | 460 |

*Values determined from stress/elongation curves at a traction speed of 2 cm/min
**$\overline{Mn} \times 10^{-3}$.

EXAMPLES 9 AND 10

GENERAL OPERATING METHOD

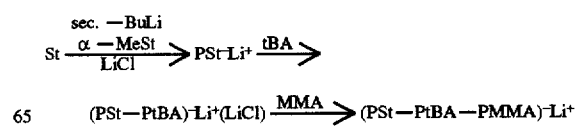

-continued

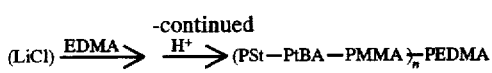

The three monomers St, tBA and MMA are polymerised successively according to the operating conditions described for Examples 1 to 8.

The living (PSt—PtBA—PMMA)⁻Li⁺ triblock copolymer thus obtained is then coupled with EDMA according to the operating methods described for the preceding examples.

To give the material its thermoplastic elastomer properties, the PtBA block is then transesterified to PnBA according to the operating conditions described for Examples 1 to 8.

Table 5 below summarises the characteristics of the products obtained.

TABLE 5

| Ex | $\overline{Mn}$ of PSt-PtBA-PMMA* | $\overline{Mn}$ of PSt-PtBA* | $\overline{Mn}$ of PtBA* | % of tBA by weight** | $\overline{Mw}/\overline{Mn}$ of PSt-PtBA-PMMA | Mole EDMA / Mole sec.BuLi | $\bar{n}$* | % coupling |
|----|-----------------------------------|------------------------------|--------------------------|----------------------|-----------------------------------------------|---------------------------|------------|------------|
| 9  | 160,000                           | 145,000                      | 120,000                  | 72                   | 1.1                                           | 6.0                       | 5.0        | 60         |
| 10 | 101,000                           | 86,000                       | 63,500                   | 60                   | 1.07                                          | 5.6                       | 4.4        | 77         |

*Values determined by gel extrusion chromatography
**Value determined by ¹H NMR

Table 6 reproduces the mechanical properties of the material of Example 10, after transesterification.

TABLE 6

| Ex. | Polymer (PSt-PtBA-PMMa)$_n$ PEDMA** | Elastic limit $\overline{\sigma}_y$ N/mm² (kg/mm²)* | Breaking stress $\overline{\sigma}_z$ N/mm² (kg/mm²)* | Elongation at break $\epsilon_r$ (%) |
|-----|-------------------------------------|-----------------------------------------------------|--------------------------------------------------------|--------------------------------------|
| 10  | 22.5-63.5-15                        | 8.83 (0.90)                                         | 12.36 (1.26)                                           | 235                                  |

*Values determined from stress/elongation curves at a traction speed of 2 cm/min
**$\overline{Mn}$ × 10⁻³.

EXAMPLES 11 AND 12

GENERAL OPERATING METHOD

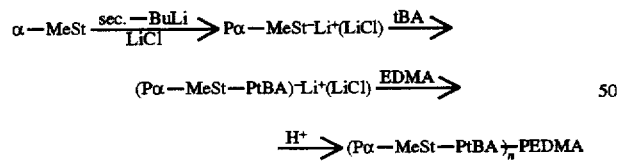

The copolymerisation is carried out under the same conditions as those described for Examples 1 to 7, except that α-MeSt is employed instead of styrene.

The coupling of the living (P—MeSt—PtBA)⁻Li⁺ diblock copolymer using EDMA and the transesterification of PtBA to PnBA are carried out under the same conditions as those mentioned above.

Table 7 below summarises the characteristics of the products obtained.

TABLE 7

| Ex | $\overline{Mn}$ of Pα-MeSt-PtBA* | $\overline{Mn}$ of PtBA* | % of TBA by weight** | $\overline{Mw}/\overline{Mn}$ Pα-MeSt-PtBA | Mole EDMA Mole sec.BuLi | $\bar{n}$* | % of coupling |
|----|----------------------------------|--------------------------|----------------------|-------------------------------------------|-------------------------|------------|---------------|
| 11 | 140,000 | 109,000 | 70 | 1.12 | 6.0 | 3.8 | 78 |
| 12 | 102,000 | 75,000 | 70 | 1.2 | 5.2 | 3.5 | 57 |

*Values determined by gel exclusion chromatography
** Value determined by $^1$H NMR

EXAMPLE 13

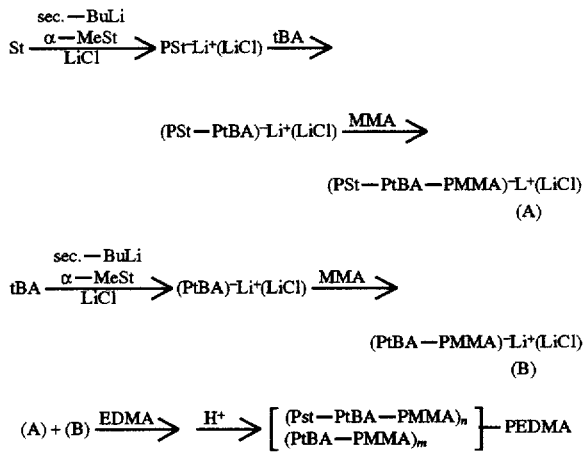

The block copolymerisation of the living polymer (A) takes place according to the operating conditions described for Examples 9 and 10. The first PtBA "block of the polymer (B) is initiated in THF at −78° C. with an organolithium compound which has been obtained by reacting sec-butyllithium with a slight molar excess of α-MeSt in the presence of 5 moles of LiCl per mole of this organolithium compound. After 30 min of polymerisation at −73° C., methyl methacrylate is introduced into the reaction mixture via a metal capillary, under inert atmosphere. The block anionic copolymerisation is carried out over a period of one hour in THF at −78° C.

Next, the two living polymers are mixed at −78° C. under inert atmosphere, with the aid of a suitable experimental apparatus. After homogenisation of the solution the mixture of living di- and triblock copolymers is then coupled at −78° C. by adding to it EDMA in a molar excess of 4 to 26 relative to the organolithium active centres and leaving it to react for at least two hours.

Recovery of the polymer after coupling is carried out under the same conditions as those described for the preceding examples.

The PtBA blocks are then transesterified to PnBA; the transesterification reaction takes place using acidic catalysis with the aid of PTSA according to the operating method described for the preceding examples.

Under these conditions the PMMA blocks remain intact and the transesterification yield is close to 95%.

Table 8 below summarises the characteristics of a product obtained.

TABLE 8

| Ex. | Branch | $\overline{Mn}$ of PSt-PtBA-PMMA* | $\overline{Mn}$ of PSt-PtBA* | $\overline{Mn}$ of PtBA* | % tBA by weight** | $\overline{Mw}/\overline{Mn}$ of PSt-PtBA-PMMA* |
|-----|--------|-----------------------------------|------------------------------|--------------------------|-------------------|-------------------------------------------------|
| 13  | A      | 113,000                           | 98,000                       | 72,000                   | 60                | 1.15                                            |

| Ex. | Branch | $\overline{Mn}$ of PtBA-PMMA* | $\overline{Mw}/\overline{Mn}$ of PtBA-PMMA* | $\overline{Mn}$ of PtBA* | $\overline{Mw}/\overline{Mn}$ PtBA* | % tBA by weight** |
|-----|--------|-------------------------------|---------------------------------------------|--------------------------|-------------------------------------|-------------------|
| 13  | B      | 157,000                       | 1.15                                        | 97,000                   | 1.1                                 | 71                |

| Mole EDMA Mole sec-BuLi | $\overline{Mn}$ after coupling* | % coupling |
|-------------------------|----------------------------------|------------|
| 8.0                     | 760,000                          | 79         |

*Values determined ny gel exclusion chromatography
**Value deterimind $^1$H NMR

Example 14

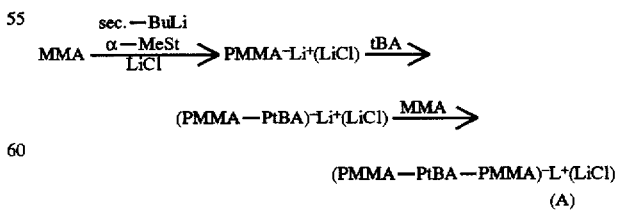

-continued $$(PtBA-PMMA)^-Li^+(LiCl)$$
$$(B)$$

The block anionic copolymerisation of the living polymers (A) and (B) takes place according to the operating conditions described for Examples 8 and 13 respectively.

The coupling of the mixture of the living copolymers (PMMA—PtBA—PMMA)$^-$Li$^+$ and (PtBA—PMMA)$^-$Li$^+$ using EDMA, and the transesterification of the PtBA blocks to PnBA are carried out under the same conditions as those described for Example 13.

Table 9 below summarises the characteristics of a product obtained.

TABLE 9

| Ex. | Branch | $\overline{Mn}$ of PMMA-PtBA-PMMA* | $\overline{Mn}$ of PMMA-PtBA* | $\overline{Mn}$ of PtBA* | % tBA by weight** | $\overline{Mw}/\overline{Mn}$ of PMMA-PtBA-PMMA* |
|---|---|---|---|---|---|---|
| 14 | A | 62,000 | 52,000 | 41,200 | 61 | 1.15 |

| Ex. | Branch | $\overline{Mn}$ of PtBA-PMMA* | $\overline{Mw}/\overline{Mn}$ of PtBA-PMMA* | $\overline{Mn}$ of PtBA* | $\overline{Mw}/\overline{Mn}$ PtBA* | % tBA by weight** |
|---|---|---|---|---|---|---|
| 14 | B | 42,000 | 1.12 | 32,000 | 1.1 | 75 |

| $\dfrac{\text{Mole EDMA}}{\text{Mole sec-BuLi}}$ | $\overline{Mn}$ after coupling* | % coupling |
|---|---|---|
| 9.0 | 344,000 | 81 |

*Values determined by gel exclusion chromatography
**Value determined by $^1$H NMR

EXAMPLE 15

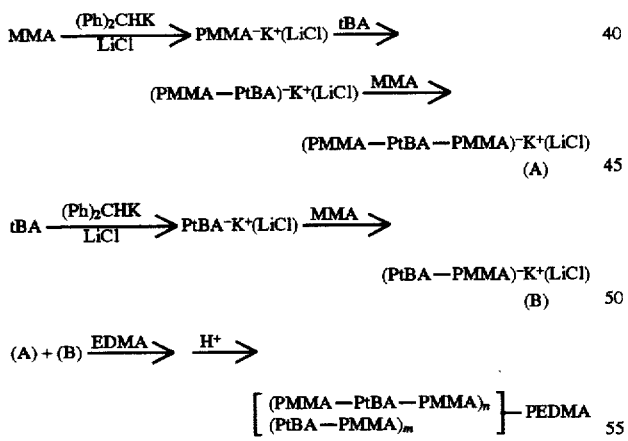

The block anionic copolymerisation of the living polymers (A) and (B) takes place according to the operating conditions described for Example 8 and 13 respectively, the only difference being that the initiator is diphenylmethylpotassium in this case.

The coupling of the mixture of the living polymers (PMMA—PtBA—PMMA)$^-$K$^+$ (LiCl) and (PtBA—PMMA)$^-$K$^+$ (LiCl) using EDMA and the transesterification of the PtBA blocks to PnBA are carried out under the same conditions as those mentioned for Example 13.

Table 10 below summarises the characteristics of a product obtained.

TABLE 10

| Branch | $\overline{Mn}$ of PMMA-PtBA-PMMA | $\overline{Mn}$ of PMMA-PtBA | $\overline{Mn}$ of PtBA | % tBA by weight | $\overline{Mw}/\overline{Mn}$ of PMMA-PtBA-PMMA |
|---|---|---|---|---|---|
| A | 62,000 | 52,000 | 41,200 | 61 | 1.15 |

| Branch | $\overline{Mn}$ of PtBA-PMMA | $\overline{Mw}/\overline{Mn}$ of PtBA-PMMA | $\overline{Mn}$ of PtBA | $\overline{Mw}/\overline{Mn}$ PtBA | % tBA by weight |
|---|---|---|---|---|---|
| B | 42,000 | 1.12 | 32,000 | 1.1 | 75 |

| Mole EDMA / Mole sec-BuLi | $\overline{Mn}$ after coupling* | % coupling |
|---|---|---|
| 9.0 | 344,000 | 81 |

*Values determined by gel exclusion chromatography

Example 16

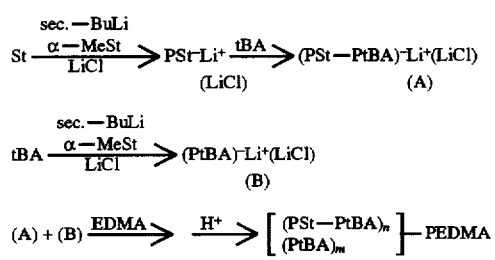

The block copolymerisation of the living polymer (A) takes place according to the operating conditions described for Examples 9 and 10. The PtBA block of the polymer (B) is initiated in THF at −78° C. with an organolithium compound which has been obtained by reacting sec-butyllithium with a slight molar excess of α-MeSt in the presence of 5 moles of LiCl per mole of this organolithium compound.

Next, the two living polymers are mixed at −78° C. under an inert atmosphere in a suitable experimental apparatus. After homogenisation of the solution the mixture of living di- and monoblock copolymers is then coupled at −78° C. by adding to it EDMA in a molar excess of 4 to 26 relative to this organolithium active centres and leaving it to react for at least two hours.

Recovery of the polymer after coupling is carried out under the same conditions as those described for the preceding examples.

The PtBA blocks are then transesterified to PnBA; the transesterification reaction takes place using acidic catalysis with the aid of PTSA according to the operating method described for the preceding examples.

Table 11 below summarises the characteristics of a product obtained.

TABLE 11

| Branch | $\overline{Mn}$ of PSt-PtBA | $\overline{Mn}$ of PSt | $\overline{Mn}$ of PtBA | % tBA by weight | $\overline{Mw}/\overline{Mn}$ of PSt-PtBA |
|---|---|---|---|---|---|
| A | 50,000 | 15,000 | 35,000 | 68 | 1.15 |

| Branch | $\overline{Mn}$ of PtBA | $\overline{Mw}/\overline{Mn}$ of PtBA |
|---|---|---|
| B | 60,000 | 1.10 |

The mechanical properties of this product after transesterification are listed in Table 12 below.

TABLE 12

| Mole EDMA / Mole sec.BuLi | % coupling | $\sigma_r$ N/mm² (kg/mm²) | $\epsilon_r$ % |
|---|---|---|---|
| 17 | 88 | 6.86 (0.70) | 707 |

Example 17

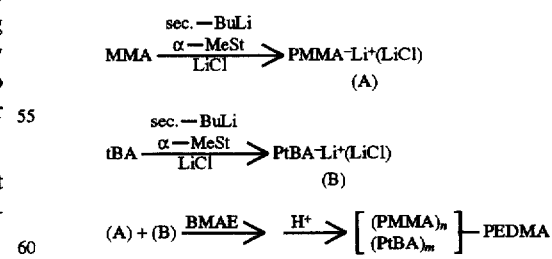

The copolymerisation of the living polymers (A) and (B) takes place according to the operating conditions described for Examples 8 and 10. The PtBA and PMMA blocks are initiated in THF at −78° C. with an organolithium compound which has been obtained by reacting sec-butyllithium with a slight molar excess of α-MeSt in the presence of 5 moles of LiCl per mole of this organolithium compound. After 15 minutes' polymerisation at −78° C., MMA or tBA is introduced into the reaction mixture using a metal capillary, under an inert atmosphere. The anionic copolymerisation is carried out for a period of one hour in THF at −78° C.

Next, the two living polymers are mixed at −78° C. under inert atmosphere with the aid of a suitable experimental apparatus. After homogenisation of the solution the mixture of living homopolymers is then coupled at −78° C. by adding to it EDMA in a slight molar excess of 4 to 26 relative to the organolithium active centres and leaving it to react for at least two hours.

Recovery of the polymer after coupling is carried out under the same conditions as those described for the preceding examples.

The PtBA blocks are then transesterified to PnBA; the transesterification reaction takes place using acidic catalysis with the aid of PTSA according to the operating method described for the preceding examples.

Under these conditions the PMMA blocks remain intact and the transesterification yield is close to 95%.

Table 13 below summarises the characteristics of a product obtained.

TABLE 13

| Branch | $\bar{M}n$ of PtBA | $\bar{M}w/\bar{M}n$ of PtBA |
|---|---|---|
| A | 100,000 | 1.15 |

| Branch | $\bar{M}n$ of PMMA | $\bar{M}w/\bar{M}n$ of PMMA |
|---|---|---|
| B | 15,000 | 1.15 |

The mechanical properties of this product after transesterification are listed in Table 14 below.

| Mole EDMA Mn × 10³ | $\bar{M}n$ after coupling* | Coupling % | Breaking stress $\sigma_r$ N/mm² (kg/mm²) | Elongation at break $\epsilon_r$ % |
|---|---|---|---|---|
| 5.0 | 887,000 | 90 | 0.69 (0.07) | 65 |

*Value determined by gel exclusion chromatography

Example 18

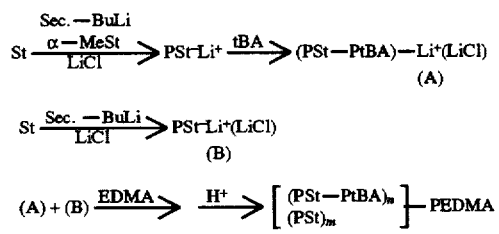

The block copolymerisation of the living polymer (A) takes place according to the operating conditions described for Examples 9 and 10. The first block (PSt—PtBA) is initiated in THF at −78° C. with an organolithium compound which has been obtained by reacting sec-butyllithium with a slight molar excess of α-MeSt in the presence of 5 moles of LiCl per mole of this organolithium compound. After 15 minutes' polymerisation of styrene at −78° C., tBA is introduced into the reaction mixture using a metal capillary, under an inert atmosphere. The block anionic copolymerisation is carried out over a period of 15 minutes in THF at −78° C.

Next, the two living polymers are mixed at −78° C. under inert atmosphere in a suitable experimental apparatus. After homogenisation of the solution the mixture of living di- and monoblock copolymers is then coupled at −78° C. by adding to it EDMA in a molar excess of 4 to 26 relative to the organolithium active centres and leaving it to react for at least 2 hours.

Recovery of the polymer after coupling is carried out under the same conditions as those described for the preceding examples.

The PtBA blocks are then transesterified to PnBA; the transesterification reaction takes place using acidic catalysis with the aid of PTSA according to the operating method described for the preceding examples.

Table 15 below summarises the characteristics of a product obtained.

TABLE 15

| Branch | $\bar{M}n$ of PSt—PtBA | $\bar{M}n$ of PtBA | % tBA by weight | $\bar{M}w/\bar{M}n$ of PSt—PtBA |
|---|---|---|---|---|
| A | 92,000 | 77,000 | 80 | 1.15 |

| Branch | $\bar{M}n$ of PSt | $\bar{M}w/\bar{M}n$ of PSt |
|---|---|---|
| B | 15,000 | 1.05 |

The mechanical properties of this product after transesterification are listed in Table 16 below.

TABLE 16

| Mole EDMA Mole sec-BuLi | % coupling | Breaking stress $\sigma_r$ N/mm² (kg/mm²) | Elongation at break $\epsilon_r$ % |
|---|---|---|---|
| 26 | 70 | 7.55 (0.70) | 707 |

We claim:

1. A process for the manufacture of a star-Shaped block copolymer of the formula (I)

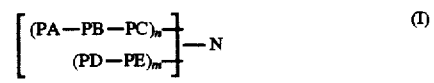

in which, in embodiments (a), (b), (c) and (d)

(a) PA is optionally present and denotes a polymer block originating from at least one monomer A selected from vinylaromatic and methacrylic monomers;

PB denotes a polymer block originating from at least one acrylic monomer B;

PC is optionally present and denotes a polymer block originating from at least one monomer C selected from methacrylic monomers; and PD denotes a polymer block originating from at least one monomer D selected from vinylaromatic and methacrylic monomers, and simultaneously PE denotes a polymer block originating from at least one acrylic monomer E; or PD denotes a polymer block originating from at least one acrylic monomer D and simultaneously PE denotes a polymer block originating from at least one methacrylic monomer E; or (b) each of PA and PC denotes a polymer block originating from the same single acrylic monomer;

PB denotes a polymer block originating from at least one monomer-B selected from methacrylic monomers; and PD denotes a polymer block originating from at least one monomer D selected from vinylaromatic and methacrylic monomers, and simultaneously PE denotes a polymer block originating from at least one acrylic monomer E; or PD denotes a polymer block originating from at least one acrylic monomer D and simultaneously PE denotes a polymer block originating from at least one methacrylic monomer E; or (c) the embodiment of (a) or (b) as defined above with the proviso that one of the branches (PA—PB—PC) or (PD—PE) contains a single polymer sequence selected from acrylic, vinylaromatic and methacrylic monomers; or (d) both of the branches (PA—PB—PC) and (PD—PE) simultaneously contain a different single polymer sequence, one being of an acrylic monomer and the other of a monomer selected from vinylaromatic and methacrylic monomers;

n denotes the number of branches of (PA—PB—PC) and is between 2 and 20 inclusive, and m denotes the number of branches of (PDPE) and is between 0 and 18 inclusive, with the proviso that the sum n+m does not exceed the value of 20 and for said embodiments (c) and (d), m is >0; and N denotes a cross-linked nodule of at least one polymerized monomer Mr, the said monomer Mr consisting of a multifunctional cross-linking agent containing at least two polymerizable double bonds per molecule;

comprising the steps of:

(1) anionic polymerizing at least one monomer A with the aid of an initiating system comprising at least one monofunctional initiator of the formula (II):

$$(R)_p\text{—M} \qquad (II)$$

in which:

M denotes an alkali or alkaline-earth metal with a valency p of 1 or 2; and

R denotes a straight- or branched-chain alkyl radical containing 2 to 6 carbon atoms or an optionally substituted aryl radical or an alkyl radical containing 1 to 6 carbon atoms substituted by at least one phenyl group;

and at least one ligand selected from the salts of alkali or alkaline-earth metals, organic salts of alkali metals and nonnitrogenous macrocyclic complexants, to obtain a living chain unit of the polymer block PA then (2) reacting said living chain unit thus obtained with at least one monomer B in the presence of at least one said ligand, to obtain a living diblock copolymer (PA—PB)⁻; then (3) reacting said living diblock copolymer thus obtained with at least one monomer C in the presence of at least one said ligand, to obtain the living triblock copolymer (PA—PB—PC)⁻;

or for steps (1) to (3) above, step (3) is omitted to obtain the living diblock copolymer (PA—PB)⁻; or for steps (1) to (3) above the process is started by conducting step (1) with the monomer B, step (2) is conducted with the monomer C and step (3) is omitted to obtain the living diblock copolymer (PB—PC)⁻; or for steps (1) to (3) the process is started by conducting step (1) with the monomer A or B or C and steps (2) and (3) are omitted to obtain the living block PA⁻ or PB⁻ or PC⁻;

(4) when m>0, forming a living diblock copolymer (PDPE) by proceeding as in steps (1) and (2), replacing said monomer A with at least one monomer D and replacing said monomer B with at least one monomer E; or forming living block PD or PE by conducting step (1) with the monomers D or E;

(5) mixing the living copolymer (PA—PB—PC)⁻ or (PA—PB)⁻ or (PB—PC) or the living block PA⁻ or PB⁻ or PC⁻, with the living diblock copolymer (PD—PE)⁻ or the living block PD or PE obtained according to step (4), and reacting the mixture in the medium which has been used for conducting their polymerization by anionic route, with at least one monomer Mr in a molar excess of 4 to 26 per active centre, and deactivating the double bonds by reacting the mixture with a proton source.

2. The process according to claim 1, wherein in step (5), the proton source is alcohol, water or a protonic acid.

3. The process according to claim 1, wherein subsequent to step (5), the star-shaped polymer is transesterified in an acidic medium.

4. The process according to claim 1, wherein in the polymerization steps, the molar proportion of the ligand to the initiator is from 1 to 50.

5. The process according to claim 1, wherein steps (1) to (5) are carried out at a temperature of from −78° C. to 0° C.

6. The process according to claim 1, wherein steps (1) to (5) are carried out in at least one solvent.

7. A process for the manufacture of a star-shaped block copolymer of the formula (I)

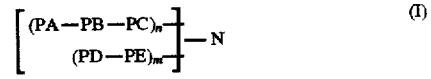

in which, in embodiments, (a), (b), (c) and (d)

(a) PA is optionally present and denotes a polymer block originating from at least one monomer A selected from vinylaromatic and methacrylic monomers;

PB denotes a polymer block originating from at least one acrylic monomer B;

PC is optionally present and denotes a polymer block originating from at least one monomer C selected from methacrylic monomers; and PD denotes a polymer block originating from at least one monomer D selected from vinylaromatic and methacrylic monomers, and simultaneously PE denotes a polymer block originating from at least one acrylic monomer E; or PD denotes a polymer block originating from at least one acrylic monomer D and simultaneously PE denotes a polymer block originating from at least one methacrylic monomer E; or each of PA and PC denotes a polymer block originating from the same single acrylic monomer;

PB denotes a polymer block originating from at least one monomer B selected from methacrylic monomers; and PD denotes a polymer block originating from at least one monomer D selected from vinylaromatic and methacrylic monomers, and simultaneously PE denotes a polymer block originating from at least one acrylic monomer E; or PD denotes a polymer block originating from at least one acrylic monomer D and simultaneously PE denotes a polymer block originating from at least one methacrylic monomer E; or the embodiment of (a) or (b) as defined above with the proviso that one of the branches (PA—PB—PC) or (PD PE) contains a single polymer sequence selected from acrylic, vinylaromatic and methacrylic monomers; or both of the branches (PA—PB—PC) and (PD—PE) simultaneously contain a different single polymer sequence, one being of an acrylic monomer and the other of a monomer selected from vinylaromatic and methacrylic monomers;

n denotes the number of branches of (PA—PB—PC) and is between 2 and 20 inclusive, and m denotes the number of branches of (PDPE) and is between 0 and 18 inclusive, with the proviso that the sum n+m does not exceed the value of 20 and for said embodiments (c) and (d), m is >0; and N denotes a cross-linked nodule of at least one polymerized monomer Mr, the said monomer Mr consisting of a multifunctional cross-linking agent containing at least two polymerizable double bonds per molecule;

comprising the steps of:

(1) anionic polymerizing at least one monomer A with the aid of an initiating system comprising at least one monofunctional initiator of the formula (II):

$(R)_p—M$            (II)

in which, in embodiments (a), (b), (c) and (d)

M denotes an alkali or alkaline-earth metal with c valency p of 1 or 2; and

R denotes a straight- or branched-chain alkyl radical containing 2 to 6 carbon atoms or an optionally substituted aryl radical or an alkyl radical containing 1 to 6 carbon atoms substituted by at least one phenyl group, to obtain a living chain unit of the polymer block PA⁻; then (2) reacting said living chain unit thus obtained with at least one monomer B, to obtain a living diblock copolymer (PA—PB)⁻; then (3) reacting said living diblock copolymer thus obtained with at least one monomer C, to obtain the living triblock copolymer (PA—PB—PC)⁻;

or for steps (1) to (3) above, step (3) is omitted to obtain the living diblock copolymer (PA—PB)⁻; or for steps (1) to (3) above the process is started by conducting step (1) with the monomer B, step (2) is conducted with the monomer C and step (3) is omitted to obtain the living diblock copolymer (PB—PC)⁻; or for steps (1) to (3) the process is started by conducting stage (1) with the monomer A or B or C and steps (2) and (3) are omitted to obtain the living block PA⁻ or PB⁻ or PC⁻, (4) when m>0, forming a living diblock copolymer (PDPE) by proceeding as in steps (1) and (2), replacing said monomer A with at least one monomer D and replacing said monomer B with at least one monomer E; or forming living block PD or PE by conducting step (1) with the monomers D or E;

(5) mixing the living copolymer (PA—PB—PC)⁻ or (PA—PB)⁻ or (PB—PC) or the living block PA⁻ or PB⁻ or PC⁻, with the living diblock copolymer (PD—PE)⁻ or the living block PD⁻ or PE⁻ obtained according to step (4), and reacting the mixture in the medium which has been used for conducting their polymerization by anionic route, with at least one monomer Mr in a molar excess of 4 to 26 per active centre, and deactivating the double bonds by reacting the mixture with a proton source.

8. The copolymer according to claim 1 wherein the polymer block PA originates from at least one vinyl aromatic monomer.

9. The copolymer according to claim 7 wherein the polymer block PA originates from at least one vinyl aromatic monomer.

10. The copolymer according to claim 1 wherein the polymer block PD originates from at least one vinyl aromatic monomer.

11. The copolymer according to claim 7 wherein the polymer block PD originates from at least one vinyl aromatic monomer.

12. A process for manufacturing a star-shaped block copolymer of formula $(PA—PB—PC)_n—N—(PD—PE)_m$ in which:

PA is absent;

PB denotes a polymer block originating from at least one acrylic monomer B;

PC is absent;

PD denotes a polymer block originating from at least one monomer D selected from vinylaromatic and methacrylic monomers and PE denotes a polymer block originating from at least one acrylic monomer E; or alternatively PD denotes a polymer block originating from at least one acrylic monomer D and PE denotes a polymer block originating from at least one methacrylic monomer E;

n denotes the number of branches of (PB) and is between 2 and 20 inclusive and m denotes the number of branches of (PD—PE) and is between 0 and 18 inclusive, wherein the sum n+m does not exceed 20; and N denotes a cross-linked nodule of at least one polymerized monomer Mr comprising al multifunctional cross-linking agent containing at least two polymerizable double bonds per molecule;

the process comprising the steps of:

(1) anionically polymerizing at least one monomer B with the aid of an initiating system comprising at least one monofunctional initiator of the formula (II):

$(R)_p—M$            (II)

in which

M denotes an alkali or alkaline-earth metal with a valency p of 1 or 2; and

R denotes a straight- or branched-chain alkyl radical containing 2 to 6 carbon atoms, an optionally substituted aryl radical, or an alkyl radical containing 1 to 6 carbon atoms substituted by at least one phenyl group; to obtain a living chain unit of the polymer block PB⁻;

(2) when m>0, forming a living block PD⁻ by conducting step (1) with at least one monomer D and reacting said living chain unit thus obtained with at least one monomer E, to obtain a living diblock copolymer (PD—PE)⁻;

(3) mixing the living copolymer PB⁻ with the living block (PD—PE)⁻ obtained according to step (2), reacting the mixture with at least one monomer Mr in a molar excess of 4 to 26 per active center in the medium used for the anionic polymerization, and deactivating the double bonds by reacting the resulting product with a proton source.

13. The process of claim 12, wherein step (1) and step (2) are performed in the presence of at least one ligand selected from the alkali or alkaline-earth metal salts, organic salts of alkali metals, and non-nitrogenous macrocyclic complexing agents.

14. A process for manufacturing a star-shaped block copolymer of formula

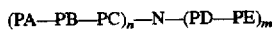
$$(PA\text{—}PB\text{—}PC)_n\text{—}N\text{—}(PD\text{—}PE)_m$$

in which:

PA denotes a polymer block originating from at least one monomer A selected from vinylaromatic and methacrylic monomers;

PB denotes a polymer block originating from at least one acrylic monomer B;

PC is absent;

PD denotes a polymer block originating from at least one monomer D selected from vinylaromatic and methacrylic monomers and PE denotes a polymer block originating from at least one acrylic monomer E; or alternatively PD denotes a polymer block originating from at least one acrylic monomer D and PE denotes a polymer block originating from at least one methacrylic monomer E;

n denotes the number of branches of (PA—PB) and is between 2 and 20 inclusive and m denotes the number of branches of (PD—PE) and is between 0 and 18 inclusive, wherein the sum n+m does not exceed 20; and N denotes a cross-linked nodule of at least one polymerized monomer Mr, said monomer Mr comprising a multifunctional cross-linking agent containing at least two polymerizable double bonds per molecule;

the process comprising the steps of:

(1) anionically polymerizing at least one monomer A with the aid of an initiating system comprising at least one monofunctional initiator of the formula (II):

$$(R)_p\text{—}M \qquad (II)$$

in which:

M denotes an alkali or alkaline-earth metal with a valency p of 1 or 2; and

R denotes a straight- or branched-chain alkyl radical containing 2 to 6 carbon atoms, an optionally substituted aryl radical, or an alkyl radical containing 1 to 6 carbon atoms substituted by at least one phenyl group; to obtain a living chain unit of the polymer block PA⁻;

(2) reacting the obtained living chain unit with at least one monomer B, to obtain a living diblock copolymer (PA—PB)⁻;

(3) when m>0, forming a living diblock copolymer (PD—PE)⁻ by proceeding as in steps (1) and (2) and replacing said monomer A with at least one monomer D and replacing said monomer B with at least one monomer E; and (4) mixing the living copolymer (PA—PB)⁻ with the living diblock copolymer (PD—PE)⁻ obtained according to step (3), reacting the mixture with at least one monomer Mr in a molar excess of 4 to 26 per active center in the medium used for the anionic polymerization, and deactivating the double bonds by reacting the resulting product with a proton source.

15. The process of claim 13, wherein steps (1), (2), and (3) are performed in the presence of at least one ligand selected from the alkali or alkaline-earth metal salts, organic salts of alkali metals, and non-nitrogenous macrocyclic complexing agents.

16. A process for manufacturing a star-shaped block copolymer of formula

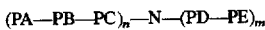
$$(PA\text{—}PB\text{—}PC)_n\text{—}N\text{—}(PD\text{—}PE)_m$$

in which:

PA is absent;

PB denotes a polymer block originating from at least one acrylic monomer B;

PC denotes a polymer block originating from at least one monomer C selected from methacrylic monomers; and PD denotes a polymer block originating from at least one monomer D selected from vinylaromatic and methacrylic monomers and PE denotes a polymer block originating from at least one acrylic monomer E; or alternatively PD denotes a polymer block originating from at least one acrylic monomer D and PE denotes a polymer block originating from at least one methacrylic monomer E;

n denotes the number of branches of (PB—PC) and is between 2 and 20 inclusive and m denotes the number of branches of (PD—PE) and is between 0 and 18 inclusive, wherein the sum n+m does not exceed 20; and N denotes a cross-linked nodule of at least one polymerized monomer Mr, said monomer Mr comprising a multifunctional cross-linking agent containing at least two polymerizable double bonds per molecule;

the process (comprising the steps of:

(1) anionically polymerizing at least one monomer B with the aid of an initiating system comprising at least one monofunctional initiator of the formula (II):

$$(R)_p\text{—}M \qquad (II)$$

in which

M denotes an alkali or alkaline-earth metal with a valency p of 1 or 2; and

R denotes a straight- or branched-chain alkyl radical containing 2 to 6 carbon atoms, an optionally substituted aryl radical, or an alkyl radical containing 1 to 6 carbon atoms substituted by at least one phenyl group; to obtain a living chain unit of the polymer block PB⁻;

(2) reacting the obtained living chain unit with at least one monomer C, to obtain a living diblock copolymer (PB—PC)⁻;

(3) when m>0, forming a living diblock copolymer (PD—PE)⁻ by proceeding as in steps (1) and (2) and replacing said monomer B with at least one monomer D and replacing said monomer C with at least one monomer E; and (4) mixing the living copolymer (PB—PC)⁻ with the living diblock copolymer (PD—PE)⁻ obtained according to step (3), reacting the mixture with at least one monomer Mr in a molar excess of 4 to 26 per active center in the medium used for the anionic polymerization, and deactivating the double bonds by reacting the resulting product with a proton source.

17. The process of claim 16, wherein steps (1), (2), and (3) are performed in the presence of at least one ligand selected from the alkali or alkaline-earth metal salts, organic salts of alkali metals, and non-nitrogenous macrocyclic complexing agents.

18. A process for manufacturing a star-shaped block copolymer of formula

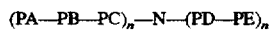

in which:
- PA denotes a polymer block originating from at least one monomer A selected from vinylaromatic and methacrylic monomers;
- PB denotes a polymer block originating from at least one acrylic monomer B;
- PC denotes a polymer block originating from at least one monomer C selected from methacrylic monomers; and
- PD denotes a polymer block originating from at least one monomer D selected from vinylaromatic and methacrylic monomers and PE denotes a polymer block originating from at least one acrylic monomer E; or alternatively
- PD denotes a polymer block originating from at least one acrylic monomer D and
- PE denotes a polymer block originating from at least one methacrylic monomer E;
- n denotes the number of branches of (PA—PB—PC) and is between 2 and 20 inclusive and m denotes the number of branches of (PD—PE) and is between 0 and 18 inclusive, wherein the sum n+m does not exceed 20; and
- N denotes a cross-linked nodule of at least one polymerized monomer Mr, said monomer Mr comprising a multifunctional cross-linking agent containing at least two polymerizable double bonds per molecule;

the process comprising the steps of:
(1) anionically polymerizing at least one monomer A with the aid of an initiating system comprising at least one monofunctional initiator of the formula (11):

in which:
- M denotes an alkali or alkaline-earth metal with a valency p of 1 or 2; and
- R denotes a straight- or branched-chain alkyl radical containing 2 to 6 carbon atoms, an optionally substituted aryl radical, or an alkyl radical containing 1 to 6 carbon atoms substituted by at least one phenyl group; to obtain a living chain unit of the polymer block PA⁻;

(2) reacting the obtained living chain unit with at least one monomer B, to obtain a living diblock copolymer (PA—PB)⁻;

(3) reacting the obtained living diblock copolymer with at least one monomer C, to obtain the living triblock copolymer (PA—PB—PC)⁻;

(4) when m>0, forming a living diblock copolymer (PD—PE)⁻ by proceeding as in steps (1) and (2) and replacing said monomer A with at least one monomer D and replacing said monomer B with at least one monomer E; and (5) mixing the living copolymer (PA—PB—PC)⁻ with the living diblock copolymer (PD—PE)⁻ obtained according to step (4), reacting the mixture with at least one monomer Mr in a molar excess of 4 to 26 per active center in the medium used for the anionic polymerization, and deactivating the double bonds by reacting the resulting product with a proton source.

19. The process of claim 18, wherein steps (1), (2), (3), and (4) are performed in the presence of at least one ligand selected from the alkali or alkaline-earth metal salts, organic salts of alkali metals, and non-nitrogenous macrocyclic complexing agents.

* * * * *

UNITED STATES PATENT AND TRADEMARK OFFICE
CERTIFICATE OF CORRECTION

PATENT NO. : 5,756,585
DATED : May 26, 1998
INVENTOR(S) : Teyssie et al.

It is certified that error appears in the above-identified patent and that said Letters Patent is hereby corrected as shown below:

Claim 1, col. 21, line 56, "PA" should read --$PA^-$--.

lines 59-60, "(PA-PB)-" should read --$(PA-PB)^-$--;

col 22, line 8, "(PDPE)" should read --(PD-PE)--;

line 11, "forming" should read --forming a--;

line 16, "PD or PE" should read --$PD^-$ or $PE^-$--.

Claim 7, col. 22, line 60, "each of" should read --(b) each of--;

col. 23, line 7, "the embodiment" should read --(c) the embodiment--;

lines 8-9, "(PD PE)" should read --(PD-PE)--;

line 11, "bohh of" should read --(d) both of--;

line 27, "comprising" should read --said process comprising-- line 28, "anionic" should read --anionically--;

line 36, "c" should read --a--;

line 59, "or $PC^-$ ," should read --or $PC^-$ ;--;

line 61, "(PDPE)" should read --$(PD-PE)^-$--;

line 64, "PD or PE" should read --$PD^-$ or $PE^-$--.

UNITED STATES PATENT AND TRADEMARK OFFICE
CERTIFICATE OF CORRECTION

PATENT NO. : 5,756,585
DATED : May 26, 1998
INVENTOR(S) : Teyssie et al.

It is certified that error appears in the above-identified patent and that said Letters Patent is hereby corrected as shown below:

Claim 12, col. 24, line 47, "al" should read --a--;
  col. 25, line 5, "(PD-PE)" should read --(PD-PE)$^-$--.

Claim 16, col. 26, line 45, "(comprising" should read --comprising--.

Claim 18, col. 28, line 6, "formula (11)" should read --formula (II)--.

Signed and Sealed this

Eighth Day of September, 1998

*Attest:*

BRUCE LEHMAN

*Attesting Officer*     Commissioner of Patents and Trademarks